(12) United States Patent
Cho (10) Patent No.: US 6,760,546 B2
(45) Date of Patent: Jul. 6, 2004

(54) VIEWFINDER MOUNTING STRUCTURE FOR CAMERA

(75) Inventor: Nae-Jin Cho, Changwon (KR)

(73) Assignee: Samsung Techwin Co., Ltd. (KR)

( * ) Notice: Subject to any disclaimer, the term of this patent is extended or adjusted under 35 U.S.C. 154(b) by 5 days.

(21) Appl. No.: 10/345,047

(22) Filed: Jan. 15, 2003

(65) Prior Publication Data

US 2003/0133705 A1 Jul. 17, 2003

(30) Foreign Application Priority Data

Jan. 15, 2002 (KR) .................................. 10-2002-0002344

(51) Int. Cl.[7] ........................ G03B 17/00; G03B 15/06; G03B 13/10
(52) U.S. Cl. ........................ 396/84; 396/175; 396/379
(58) Field of Search .................... 396/176, 141, 396/148, 150, 373, 378, 379, 380, 383, 384, 84, 175

(56) References Cited

U.S. PATENT DOCUMENTS

| | | | | |
|---|---|---|---|---|
| 5,337,109 A | * | 8/1994 | Ogawa | 396/379 |
| 5,539,490 A | * | 7/1996 | Kang et al. | 396/348 |
| 6,477,333 B1 | * | 11/2002 | Manabe et al. | 396/380 |

* cited by examiner

Primary Examiner—Russell Adams
Assistant Examiner—Rochelle Blackman
(74) Attorney, Agent, or Firm—St. Onge Steward Johnston & Reens LLC (57) ABSTRACT

A viewfinder assembly mounting system includes a mounting hole formed at least in one of a camera body and a base barrel in a direction of an optical axis, a viewfinder assembly provided with a guide hole corresponding to the mounting hole of the base barrel; and a guide member inserted and coupled to the mounting hole and the guide hole in the direction of the optical axis. The guide member is either a strobe guide member or a viewfinder lens guide member for respectively guiding a motion of the strobe and the viewfinder lens in a direction of an optical axis by synchronizing with the barrel.

12 Claims, 7 Drawing Sheets

VIEWFINDER MOUNTING STRUCTURE FOR CAMERA

FIELD OF THE INVENTION

The Present invention relates to a camera and, more particularly, to a viewfinder mounting system for mounting a viewfinder assembly to a base barrel or a camera body.

BACKGROUND OF THE INVENTION

Generally, a zoom camera of high zoom power includes a photographing camera lens and a finder lens that often create a difference in the field of view in association with a zooming operation according to the location difference between them.

To reduce such a difference in the field of view, the viewfinder assembly is often mounted onto the camera after adjusting positioning of the finder lens by moving in upward, downward, right and/or left directions. At this point, the viewfinder assembly is usually mounted to the camera by conventional screws.

However, when the viewfinder is mounted to the camera by such screws, the difference of the field of view is often aggravated, deteriorating the quality and/or function of the camera.

In addition, the use of screws makes it difficult to reduce the size of the camera as a space for mounting the screws is required.

Furthermore, the viewfinder mounting system using such screws deteriorates the productivity as the number of assembly parts is increased.

SUMMARY OF THE INVENTION

Therefore, the present invention has been made in an effort to solve the above-described problems.

It is an object of the present invention to provide a viewfinder fixing or mounting system that can improve the assembly process by preventing misalignment or distortion in the alignment thereby reducing the difference in the field of view of the viewfinder with respect to the photographing camera lens, and also reducing the number of parts by minimizing the number of screws and/or parts used for mounting the viewfinder.

To achieve the above and other objectives, the present invention provides a viewfinder assembly mounting system for a camera, comprising: a base barrel including a mounting hole formed therein in a direction of an optical axis of the camera or the viewfinder assembly, the base barrel being mounted to a camera body; a viewfinder assembly including a first guide hole disposed therein and corresponding to the mounting hole of the base barrel; a strobe including a second guide hole disposed therein between the mounting hole and the first guide hole when the strobe is received within the viewfinder assembly; and, a guide member coupled to the mounting hole of the base barrel in the direction of the optical axis after passing through the first and second guide holes.

Preferably, the guide member is a strobe guide member for guiding a motion of the strobe in the direction of the optical axis by synchronizing with, that is, in association with a movement of the barrel.

According to another aspect, the present invention provides a viewfinder mounting system for a camera, comprising: a base barrel including at least one mounting hole formed therein in a direction of an optical axis of the camera, the base barrel being mounted to a camera body; a viewfinder assembly including at least one guide hole corresponding to the mounting hole of the base barrel; and at least one guide member inserted and coupled to the mounting hole and the guide hole in the direction of the optical axis.

Preferably, the guide member is a viewfinder lens guide member for guiding a motion of the viewfinder lens in a direction of an optical axis by synchronizing with the barrel.

According to another aspect, the present invention provides a viewfinder mounting system for a camera, comprising: a camera body including a mounting hole formed therein in a direction of an optical axis; a base barrel being mounted to the camera body; a viewfinder assembly including a guide hole corresponding to the mounting hole of the camera body; and a guide member inserted and coupled to the mounting hole and the guide hole in the direction of the optical axis.

Preferably, the guide member is a viewfinder lens guide member for guiding a motion of the viewfinder lens in a direction of an optical axis by synchronizing with the barrel.

DETAILED DESCRIPTION OF PREFERRED EMBODIMENTS

Preferred embodiments of the present invention will be described more in detail in conjunction with accompanying drawings.

Figure 1:
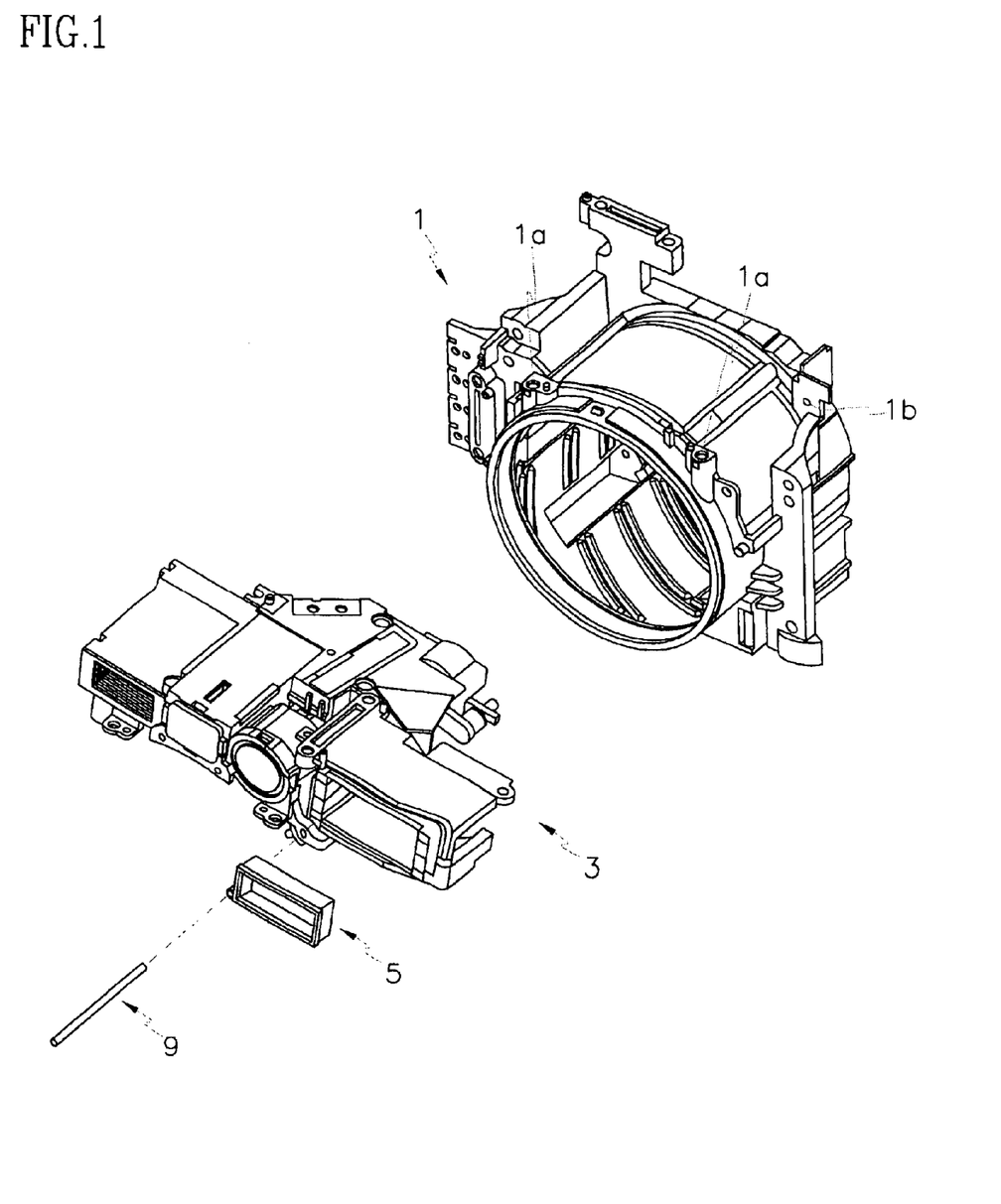
FIG. 1 is an exploded perspective view illustrating related parts of a camera where a first embodiment of the present invention is applied.
Figure 2:
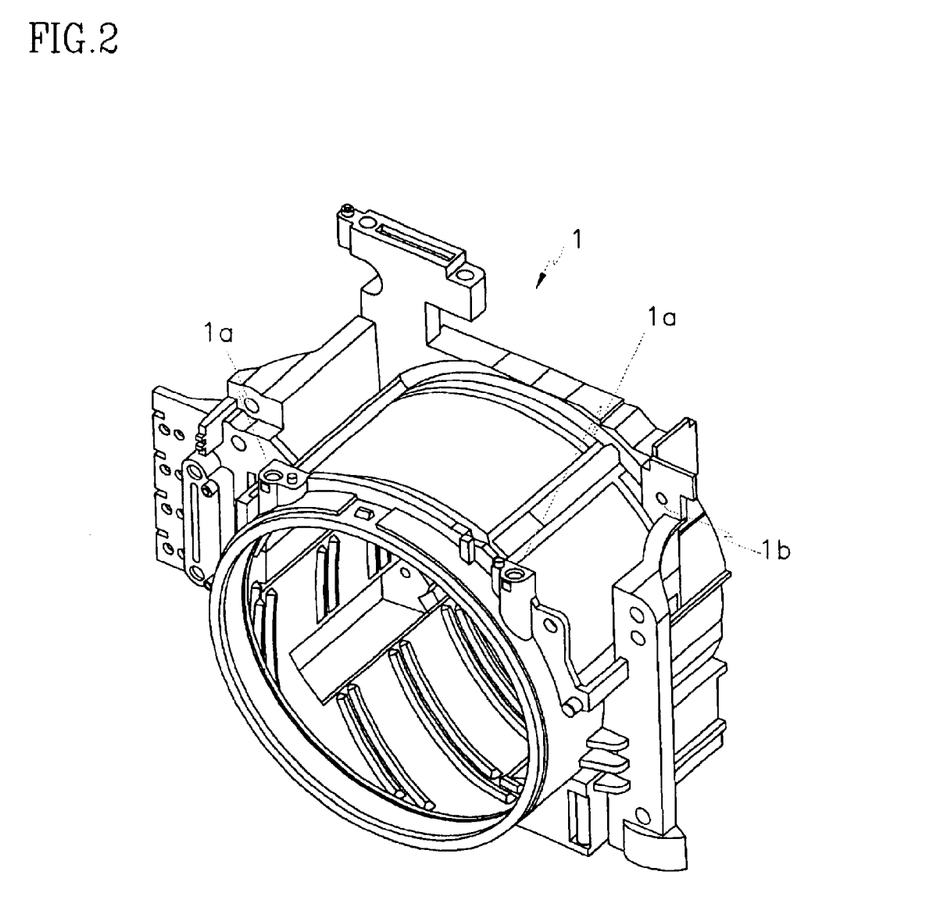
FIG. 2 is a perspective view illustrating a base barrel as depicted in FIG. 1.

FIG. 1 shows an exploded perspective view of a first embodiment of the present invention and FIG. 2 is an assembled view of FIG. 1.

As shown in the drawings, a viewfinder assembly 3 is coupled with a base barrel 1, and a strobe 5 is received within the viewfinder assembly 3. There are shown plural screws 7 and guide members 9.

As shown in FIG. 2, the base barrel 1 includes at its top portion nut portions 1a in which the screws 7 are inserted and fixed thereto. In this embodiment, although two nut portions are provided, the present invention is not limited to this. That is, only one nut portion can be provided. Particularly, it is preferable that the nut portions 1a provided on the base barrel 1 are designed such that the screws 7 can be vertically inserted so as to fix the viewfinder assembly 3 to the base barrel 1.

The base barrel 1 includes at its top rear portion a mounting hole 1b formed in a direction of an optical axis of the camera or the viewfinder assembly. Particularly, it is preferable that the mounting hole 1b is formed at a suitable location where the guide member 9 is to be inserted for guiding the motion of the strobe 5 in the direction of the optical axis in association with the movement of the barrel of a zoom camera.

Figure 3:
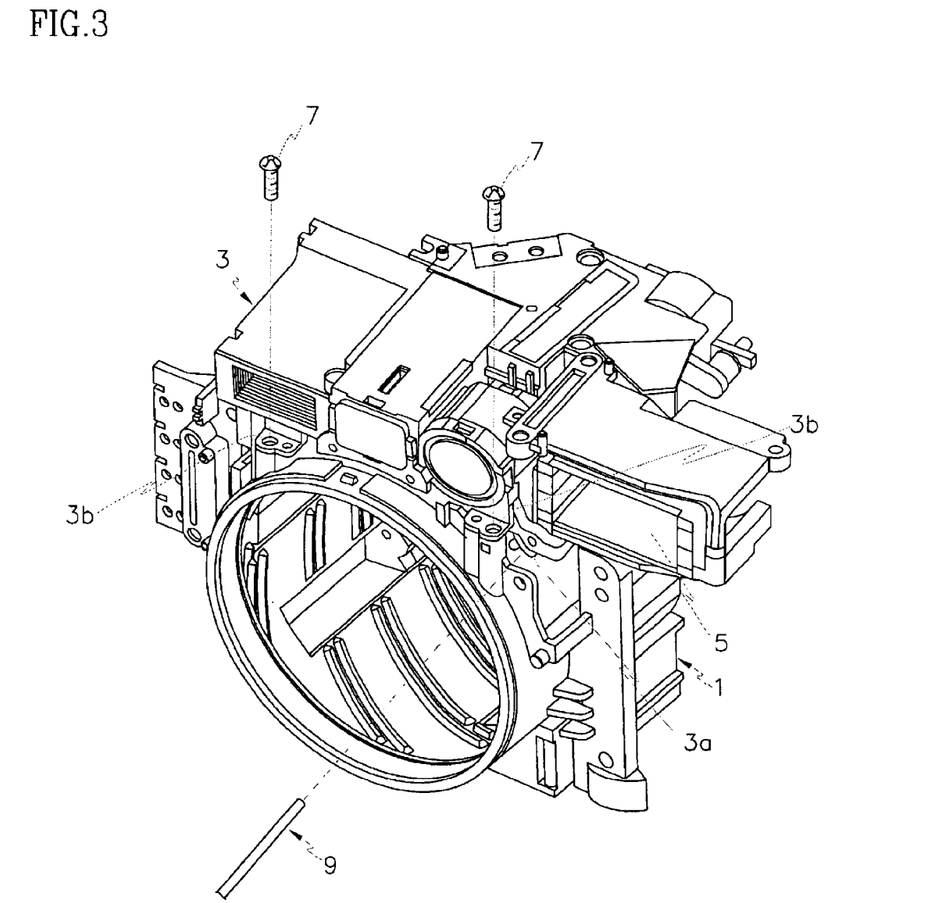
FIG. 3 is a perspective view illustrating an assembled state of the embodiment of FIG. 1.

In addition, the viewfinder assembly 3 includes a guide hole 3a corresponding to the mounting hole 1b of the base barrel 1 (see FIG. 3). The guide member 9 for moving the strobe in the direction of the optical axis passes through the guide hole 3a and then is inserted and mounted to the mounting hole 1b of the base barrel 1.

Figure 4:
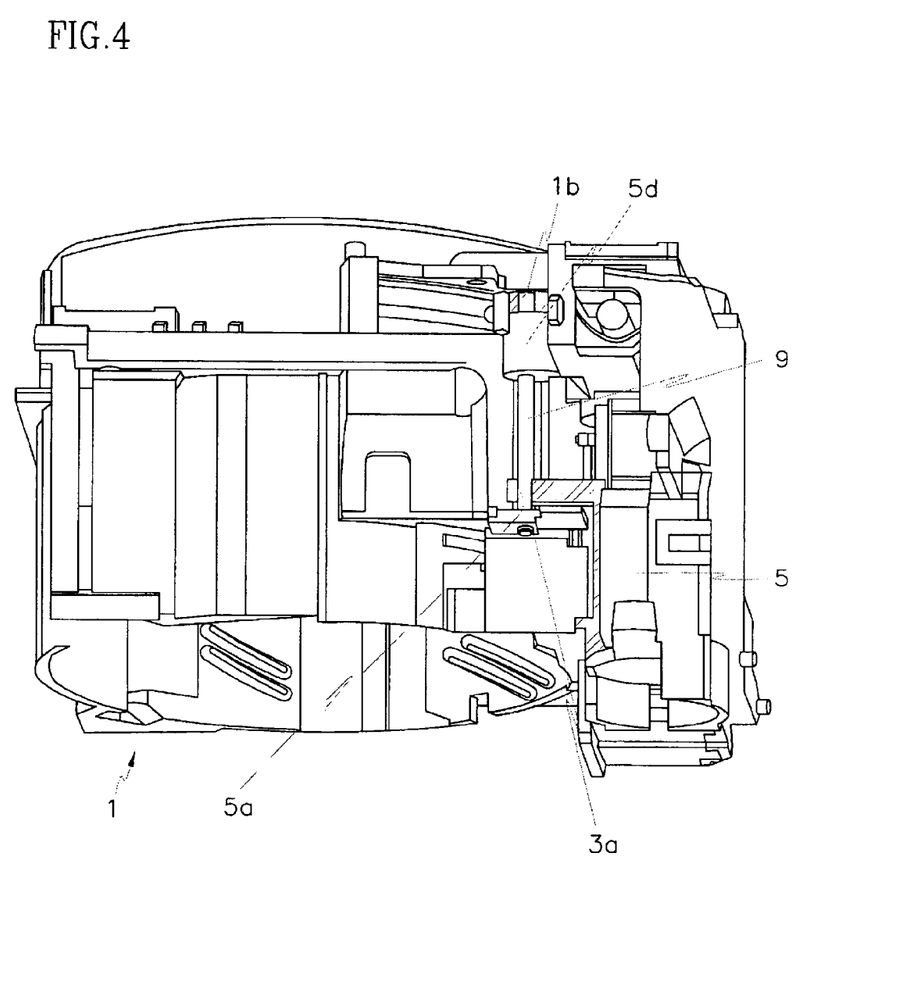
FIG. 4 is a partly cut-away plane view illustrating main parts of FIG. 3.

Further, the strobe 5 is inserted and mounted within the viewfinder assembly 3 and is preferably provided with a guide hole 5a disposed between the mounting hole 1b of the base barrel 1 and the guide hole 3a of the view finder assembly 3 (see FIG. 4).

The guide member 9 may be formed of a conventional rod and more particularly of a strobe guide member used for guiding the motion of the strobe in the direction of the optical axis. A strobe guide portion 5d, as shown in FIG. 4, is formed in a sliding coupling so that it can move along the optical axis by the guide member 9.

The viewfinder assembly 3 includes coupling holes 3b corresponding to the nut portions 1a of the base barrel 1. The coupling holes 3b are designed such that the screws 7 can be screw-coupled thereto. The number of screws 7 is determined to correspond to that of the coupling holes 3b. To minimize the number of parts, it is preferable that the number of screws is one or two.

Describing the guide member 9 more in detail, at least one viewfinder lens group is designed to move along the guide member 9 in the direction of the optical axis as the barrel moves from a wide position to a tele position, and the guide member 9 is designed to engage during this operation.

An assembly process of the above-described viewfinder assembly is described herein more in detail.

First, the viewfinder assembly 3 is first seated on the top of the base barrel 1, and the screws 7 are coupled to the nut portions 1a of the base barrel 1 through the coupling holes 3b of the viewfinder assembly 3. Next, the strobe 5 is inserted in a receiving space of the viewfinder assembly 3. At this point, the guide member 9 is inserted and mounted within the mounting hole 1b of the base barrel 1, via the guide hole 3a of the viewfinder assembly 3 and the guide hole 5a(not shown) of the strobe 5 (see FIG. 4). As a result, the viewfinder assembly 3 is aligned in the direction of the optical axis and the difference of the field of view caused by the location difference between the viewfinder lens and the camera lens is maintained to a minimal amount during the viewfinder assembly process.

Accordingly, the viewfinder assembly 3 can be easily assembled, while reducing the number of assembly parts. In addition, the viewfinder assembly 3 can be of itself aligned in the direction of the optical axis during the assembling process of the viewfinder assembly 3. Furthermore, when the guide member 9 is commonly used as a strobe guide member that guides the motion of the strobe 5 in the direction of the optical axis, the objectives of the present invention can be realized without increasing the number of parts to be assembled.

Figure 5:
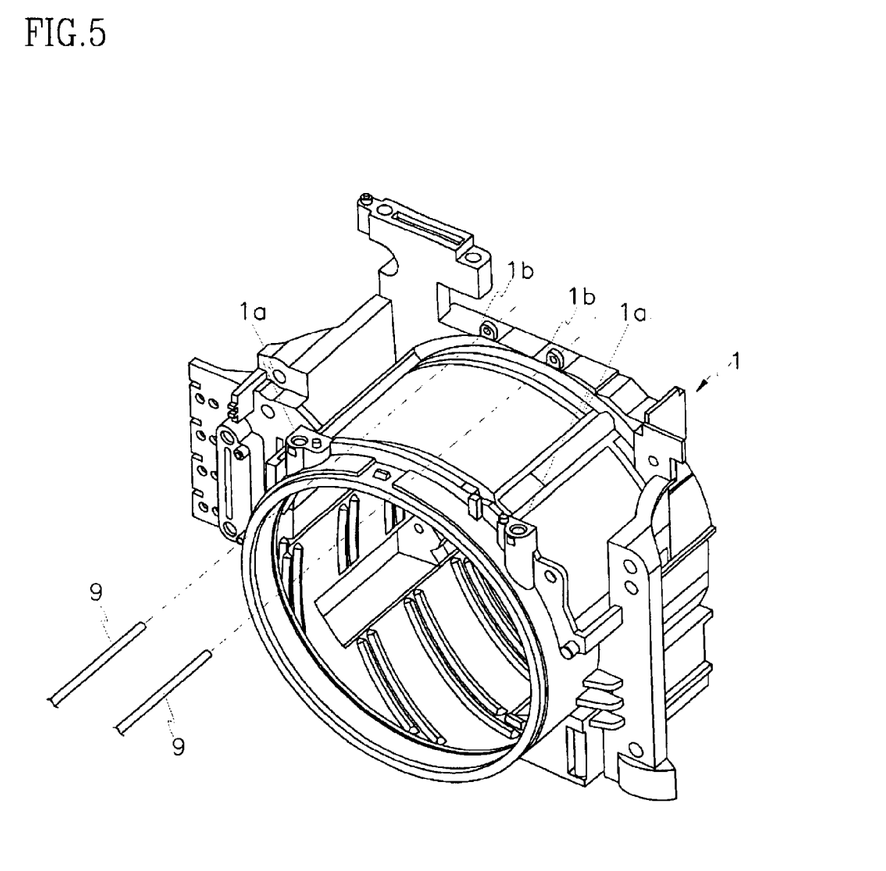
FIG. 5 is a perspective view of a base barrel of a second embodiment of the present invention.
Figure 6:
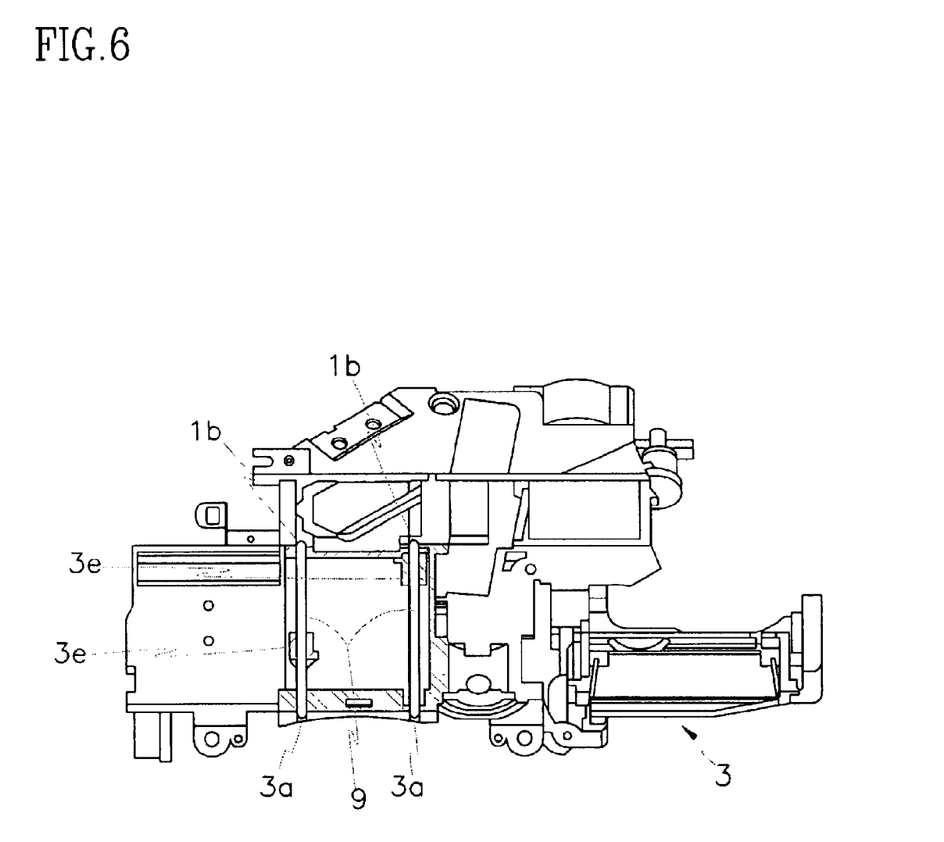
FIG. 6 is a partly cut-away plane view illustrating an assembled state of the embodiment of FIG. 5.

FIG. 5 is a perspective view of a base barrel 1 according to a second embodiment of the present invention, and FIG. 6 is a partly cross-sectional plane view showing an assembled state of the second embodiment of the invention.

In the drawings, there are shown a base barrel 1, a viewfinder assembly 3, and guide members 9.

The base barrel 1 includes at its top rear portion at least one mounting hole 1b into which the guide member 9 is inserted. Preferably, one or two mounting holes 1b may be provided.

The viewfinder assembly 3 may be provided with at least one guide hole 3a corresponding to the mounting hole 1b of the base barrel 1. Guide members 9 are inserted into the mounting holes 1b of the base barrel 1 and the guide holes 3a of the viewfinder assembly 3 such that the viewfinder assembly 3 can be mounted onto the base barrel 1 in the direction of the optical axis. Particularly, in this second embodiment, conventional viewfinder lens guide members are preferably used as the guide members 9 for guiding the motion of the viewfinder lens in the direction of the optical axis by synchronizing the barrel. Therefore, the viewfinder assembly 3 can be mounted onto the base barrel 1 without increasing the number of parts. One or two viewfinder lens guide members are preferably provided according to the design requirements.

In addition, as in the first embodiment, one or two screws can be used for the coupling of the viewfinder assembly to the base barrel 1.

Although the operational effect of this embodiment is identical to that of the first embodiment, the first embodiment is more proper for a structure where a strobe guide member is used to guide the motion of the strobe in the direction of the optical axis by synchronizing with the barrel, and the present embodiment is more proper for a structure where a viewfinder lens guide member 9 is used to guide the motion of the viewfinder lens group in the direction of the optical axis by synchronizing with the barrel according to the zooming operation. This shows that the present invention can be variously applied in accordance with the particular design requirements.

In addition, as shown in FIG. 6, a lens frame portion 3e is coupled thereto such that it can be moved in the direction of the optical axis along the guide member 9.

Figure 7:
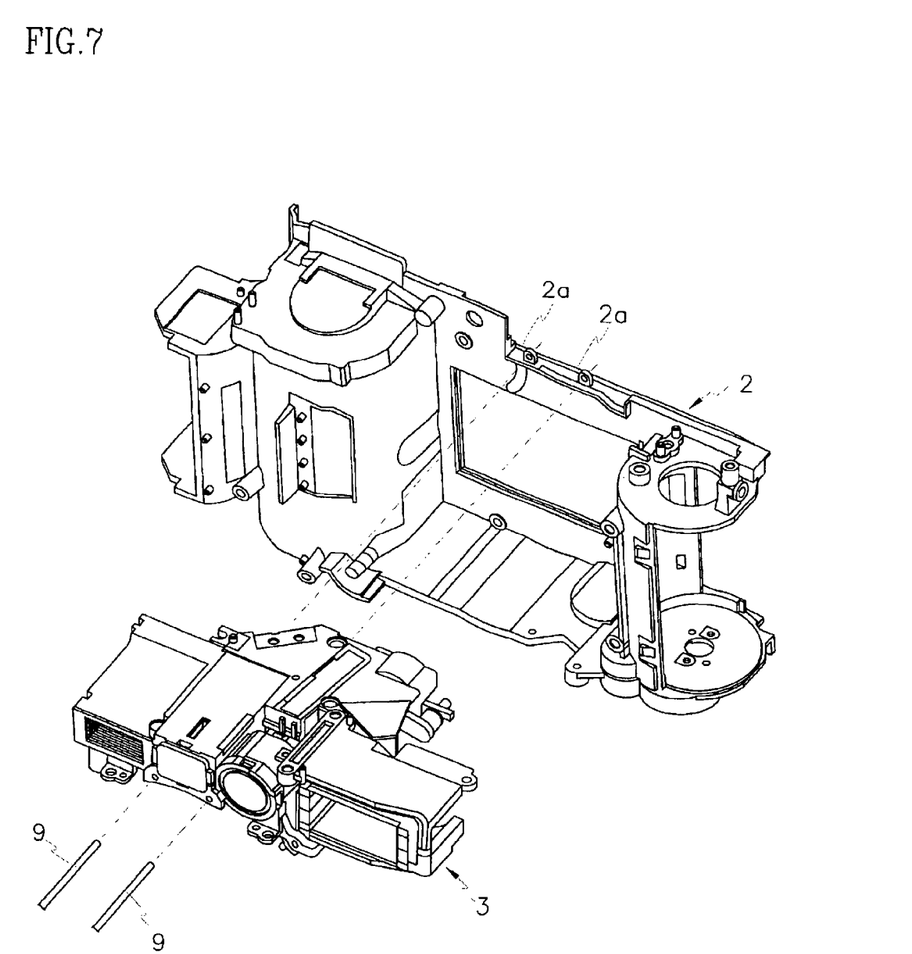
FIG. 7 is an exploded perspective view illustrating a pre-assembled state of a third embodiment of the present invention.

FIG. 7 is a view for illustrating a third embodiment of the present invention, in which a camera body 2, a base barrel 1, and a viewfinder assembly 3 are shown. In the second embodiment discussed above, the viewfinder lens guide member used as the guide member 9 passes through the viewfinder assembly 3 in the direction of the optical axis and is coupled to the base barrel 1. However, in the present embodiment, at least one mounting hole 2a is provided on the camera body 2 in horizontal alignment with the direction of the optical axis, and at least one viewfinder lens guide member 9 is inserted into the mounting hole 2a of the camera body 2.

As in the first and second embodiments, one or two screws can be used for the coupling of the viewfinder assembly to the base barrel 1.

As described in the above several embodiments of the present invention, when the viewfinder assembly 3 is coupled to the base barrel 1 (the first and second embodiments) or the camera body 2 (the third embodiment), the viewfinder assembly mounting system of the present invention is respectively configured to maintain accurate alignment of the viewfinder assembly with respect to the optical axis of the camera. Thus, the present invention can prevent misalignment, distortion or deviation in the aligned state often occurring during the assembly of conventional viewfinder assemblies with a lens barrel or a camera body, i.e., such occurrences that a pre-aligned state of the field of view of the viewfinder assembly with respect to the optical axis of the camera becomes deviated during the conventional assembling process. The present invention may reduce the number of assembly parts, and increase the production productivity and the quality of the camera.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A viewfinder mounting system for mounting a viewfinder assembly to a camera, comprising;
    a base barrel including a mounting hole formed therein in a direction of an optical axis of the camera, the base barrel being mounted to a camera body;
    a viewfinder assembly including a first guide hole disposed therein and corresponding to the mounting hole of the base barrel;
    a strobe including a second guide hole disposed therein between the mounting hole and the first guide hole when the strobe is received within the viewfinder assembly; and
    a guide member coupled to the mounting hole of the base barrel in the direction of the optical axis after passing through the first and second guide holes.

2. The viewfinder mounting system of claim 1 wherein the guide member is a strobe guide member for guiding a motion of the strobe in the direction of the optical axis in association with a movement of a lens barrel coupled with the base barrel.

3. The viewfinder mounting system of claim 2 wherein the strobe includes a strobe guide portion adapted for movement along the guide member.

4. A viewfinder mounting system for a camera, comprising:
    a base barrel including at least one circular mounting hole formed therein in a direction of an optical axis of the camera, the base barrel being mounted to a camera body;
    a viewfinder assembly including at least one guide hole corresponding to the mounting hole of the base barrel; and
    at least one guide member inserted and coupled to the circular mounting hole and the guide hole in the direction of the optical axis for guiding a motion of a viewfinder lens of the view finder assembly in the direction of the optical axis.

5. The viewfinder mounting system of claim 4 wherein the guide member is configured to guide the motion of the viewfinder lens in the direction of the optical axis in association with a movement of a lens barrel coupled with the base barrel.

6. The viewfinder mounting system of claim 5 wherein the viewfinder assembly includes a lens frame portion adapted for movement along the guide member.

7. A viewfinder mounting system for a camera, comprising:
    a camera body including a mounting hole formed therein in a direction of an optical axis of the camera;
    a base barrel being mounted to the camera body;
    a viewfinder assembly including a guide hole corresponding to the mounting hole of the camera body; and
    a guide member inserted and coupled to the mounting hole and the guide hole in the direction of the optical axis for positioning the view finder assembly to the camera body and guiding a motion of a viewfinder lens of the viewfinder assembly in the direction of the optical axis.

8. The viewfinder mounting system of claim 7 wherein the guide member is configured to guide the motion of the viewfinder lens in a direction of the optical axis in association with a movement of a lens barrel coupled with the base barrel.

9. The viewfinder mounting system of claim 8 wherein the viewfinder assembly includes a lens frame portion adapted for movement along the guide member.

10. A viewfinder mounting system for a camera, comprising:
    a base barrel including first and second mounting holes respectively formed therein in a direction of an optical axis of the camera in a parallel relation to each other, the base barrel being mounted to a camera body;
    a viewfinder assembly including first and second guide holes corresponding to the mounting holes of the base barrel; and
    first and second guide members inserted and coupled to the respective mounting holes and guide holes in the direction of the optical axis for guiding a motion of a viewfinder lens of the viewfinder assembly in the direction of the optical axis.

11. The viewfinder mounting system of claim 10 wherein the guide members are configured to guide the motion of the viewfinder lens in the direction of the optical axis in association with a movement of a lens barrel coupled with the base barrel.

12. The viewfinder mounting system of claim 11 wherein the viewfinder assembly includes at least one lens frame portion adapted for movement along the guide members.

* * * * *